(12) United States Patent
Behzad et al.

(10) Patent No.: US 8,055,313 B2
(45) Date of Patent: *Nov. 8, 2011

(54) MOBILE COMMUNICATION DEVICE WITH LOW POWER RECEIVER FOR SIGNAL DETECTION

(75) Inventors: Arya Behzad, Poway, CA (US); Ahmadreza Rofougaran, Newport Coast, CA (US)

(73) Assignee: Broadcom Corporaation

( * ) Notice: Subject to any disclaimer, the term of this patent is extended or adjusted under 35 U.S.C. 154(b) by 0 days.

This patent is subject to a terminal disclaimer.

(21) Appl. No.: 12/559,617

(22) Filed: Sep. 15, 2009

(65) Prior Publication Data

US 2010/0003935 A1    Jan. 7, 2010

Related U.S. Application Data

(63) Continuation of application No. 11/299,230, filed on Dec. 7, 2005, now Pat. No. 7,590,432.

(60) Provisional application No. 60/724,319, filed on Oct. 6, 2005.

(51) Int. Cl.
    *H04B 1/38* (2006.01)
(52) U.S. Cl. ..... 455/574; 455/572; 455/550; 455/552.1; 340/7.32
(58) Field of Classification Search .......... 455/574, 455/572, 550.1, 552.1, 553.1, 343.1; 340/7.32, 340/7.34
    See application file for complete search history.

(56) References Cited

U.S. PATENT DOCUMENTS

| 5,615,215 | A | * | 3/1997 | Utting et al. ............... 370/337 |
| 5,870,673 | A | | 2/1999 | Haartsen |
| 6,018,647 | A | * | 1/2000 | Fitzgerald .................. 455/135 |
| 6,192,230 | B1 | | 2/2001 | van Bokhorst et al. |
| 6,236,674 | B1 | | 5/2001 | Morelli et al. |
| 6,243,581 | B1 | | 6/2001 | Jawanda |
| 6,297,768 | B1 | | 10/2001 | Allen, Jr. |
| 6,678,508 | B1 | * | 1/2004 | Koilpillai et al. ............ 455/137 |

(Continued)

FOREIGN PATENT DOCUMENTS

CN    1281319    1/2001

(Continued)

OTHER PUBLICATIONS

EPO Communication dated Oct. 1, 2010 in Application No. 06014294.0-1246 / 1772978.

*Primary Examiner* — Minh D Dao
(74) *Attorney, Agent, or Firm* — McAndrews, Held & Malloy, Ltd.

(57) ABSTRACT

A mobile communication device with a low power receiver for signal detection and a method for utilizing a low power receiver for signal detection in a mobile communication device. Various aspects of the present invention comprise a first receiver module adapted to operate in a sleep mode. The first receiver module may also be adapted to receive a communication signal utilizing a first amount of power, where the communication signal is characterized by a first set of signal characteristics. A second receiver module may be adapted to receive a communication signal characterized by the first set of signal characteristics. The second receiver module may be adapted to receive a communication signal utilizing a second amount of power that is less than the first amount of power. A communication signal received by the second receiver module may be analyzed to determine a mode in which to operate the first receiver module.

26 Claims, 4 Drawing Sheets

U.S. PATENT DOCUMENTS

| | | | |
|---|---|---|---|
| 6,990,362 B2 * | 1/2006 | Simpson et al. | 455/574 |
| 7,042,858 B1 | 5/2006 | Ma et al. | |
| 7,190,679 B2 * | 3/2007 | Khawand et al. | 370/278 |
| 7,228,107 B2 | 6/2007 | Kim | |
| 7,330,653 B1 * | 2/2008 | Roberts et al. | 398/40 |
| 7,430,257 B1 * | 9/2008 | Shattil | 375/347 |
| 2003/0092451 A1 | 5/2003 | Holloway et al. | |
| 2003/0214916 A1 * | 11/2003 | Khawand et al. | 370/278 |
| 2004/0110508 A1 * | 6/2004 | Haartsen | 455/445 |
| 2004/0152419 A1 | 8/2004 | Lee | |
| 2005/0130713 A1 * | 6/2005 | Simpson et al. | 455/574 |
| 2005/0159179 A1 | 7/2005 | Sainton et al. | |
| 2005/0215280 A1 | 9/2005 | Twitchell, Jr. | |
| 2006/0270463 A1 * | 11/2006 | Copperman | 455/567 |
| 2008/0159373 A1 * | 7/2008 | Taha et al. | 375/232 |
| 2008/0246656 A1 * | 10/2008 | Ghazarian | 342/357.07 |

FOREIGN PATENT DOCUMENTS

| | | |
|---|---|---|
| CN | 1367623 | 9/2002 |
| WO | WO 99/25077 | 5/1999 |
| WO | WO 01/59945 | 8/2001 |
| WO | WO 2004-042941 | 5/2004 |
| WO | WO 2004-100399 | 11/2004 |

* cited by examiner

MOBILE COMMUNICATION DEVICE WITH LOW POWER RECEIVER FOR SIGNAL DETECTION

CROSS-REFERENCE TO RELATED APPLICATIONS/INCORPORATION BY REFERENCE

This patent application is a continuation of U.S. patent application Ser. No. 11/299,230, filed on Dec. 7, 2005, issuing on Sep. 15, 2009 as U.S. Pat. No. 7,590,432; which makes reference to, claims priority to and claims benefit from U.S. provisional patent application Ser. No. 60/724,319, filed Oct. 6, 2005. The contents of which are the aforementioned patent applications are hereby incorporated herein by reference in their entirety. This patent application is also related to U.S. patent application Ser. No. 11/297,881 filed Dec. 7, 2005, and titled "MOBILE COMMUNICATION DEVICE WITH LOW POWER SIGNAL DETECTOR". This patent application is additionally related to U.S. patent application Ser. No. 11/298,355 filed Dec. 7, 2005, and titled "SYSTEM AND METHOD PROVIDING LOW POWER OPERATION IN A MULTIMODE COMMUNICATION DEVICE", which is hereby incorporated herein in its entirety by reference.

FEDERALLY SPONSORED RESEARCH OR DEVELOPMENT

Not Applicable

SEQUENCE LISTING

Not Applicable

MICROFICHE/COPYRIGHT REFERENCE

Not Applicable

BACKGROUND OF THE INVENTION

Mobile communication devices are continually increasing in popularity. Such mobile communication devices include, for example and without limitation, cellular phones, paging devices, portable email devices, and personal digital assistants. Mobile communication devices provide the user with the capability to conduct communications while moving through a variety of environments.

Mobile communication devices typically operate utilizing portable and finite power supplies. Various methods and mechanisms have been developed to operate mobile communication devices in energy-efficient manners. For example, mobile communication devices may be operated in various sleep modes. In one exemplary illustration, a mobile communication device (or portion thereof) may operate in a sleep mode where the mobile communication device occasionally wakes up to determine if there is a communication network available and/or if there are currently messages awaiting delivery to the mobile communication device. In such exemplary sleep mode operation, the mobile communication device wakes up and fully receives and processes communication signals (e.g., through the full receive path of the mobile communication device utilizing full processing capability). Such full reception and processing expends finite energy resources, even in scenarios where there is no network available for the mobile communication device.

BRIEF SUMMARY OF THE INVENTION

Various aspects of the present invention provide a mobile communication device with a low power receiver for signal detection and a method for utilizing a low power receiver for signal detection in a mobile communication device, substantially as shown in and/or described in connection with at least one of the figures, as set forth more completely in the claims.

These and other advantages, aspects and novel features of the present invention, as well as details of illustrative aspects thereof, will be more fully understood from the following description and drawings.

DETAILED DESCRIPTION OF THE INVENTION

Figure 1:
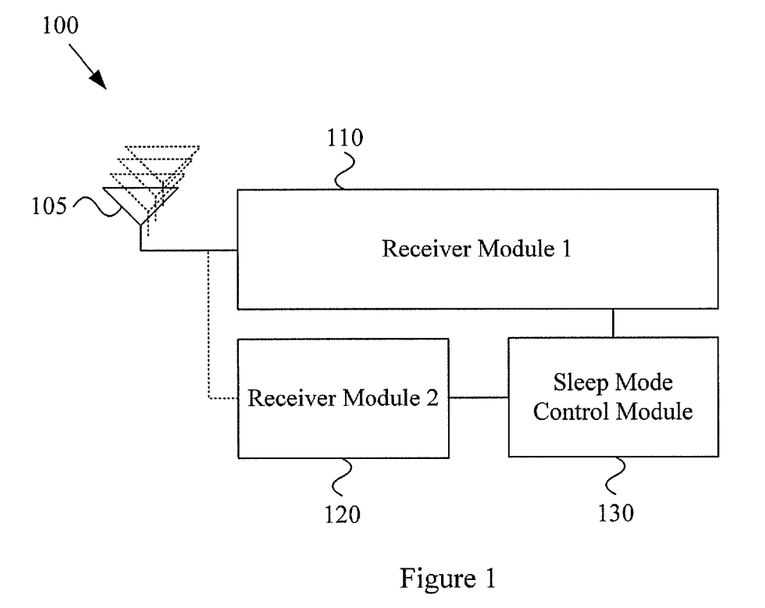
FIG. 1 is a diagram illustrating a portion of a first exemplary mobile communication device, in accordance with various aspects of the present invention.

FIG. 1 is a diagram illustrating a portion of a first exemplary mobile communication device 100, in accordance with various aspects of the present invention. The mobile communication device 100 may comprise characteristics of any of a variety of mobile communication device types. For example and without limitation, the mobile communication device 100 may comprise characteristics of a cellular phone, paging device, portable email device, personal digital assistant, portable computer with mobile communication capability, etc.

The exemplary mobile communication device 100 may comprise a first receiver module 110 that is adapted to receive at least one communication signal through an antenna 105. The following discussion may generally discuss a received communication signal as a wireless signal (e.g., an RF signal). However, the received communication signal may comprise characteristics of any of a variety of signals associated with various communication media (e.g., a wire signal, RF signal, tethered optical signal, non-tethered optical signal, etc.). Accordingly, the first receiver module 110 may comprise characteristics of any of a variety of receivers associated with such signals.

The antenna 105, as illustrated in FIG. 1, may comprise only a single antenna or a plurality of antennas (e.g., an N-antenna system, where N is an integer). For example, the antenna 105 may comprise characteristics of an antenna array utilized for Multiple-Input-Multiple-Output ("MIMO") communications or beam-forming communications. The antenna 105 may, for example, be adapted for communication in an IEEE 802.11(n) system. Accordingly, various aspects of the present invention should not be limited by characteristics of particular single antenna or multiple antenna systems.

The first receiver module 110 may be adapted to receive at least one communication signal communicated in accordance with any of a variety of communication protocols. For example and without limitation, the first receiver module 110 may be adapted to receive communication signals communicated in accordance with any or all of GSM/EDGE, GPRS, CDMA, WCDMA, TDMA, PDC, DVB-H, IEEE 802.11, IEEE 802.15, Bluetooth, Zigbee, UltraWideBand, Ethernet, Token Ring, etc.

The first receiver module 110 may, for example, be adapted to receive and process a first communication signal that is characterized by a first set of communication signal characteristics. Such a first set of communication signal characteristics may, for example, comprise frequency or frequency range characteristics, modulation characteristics, characteristics associated with a particular communication protocol, encoding characteristics, etc. For example, the first set of communication signal characteristics may correspond to a communication signal communicated in accordance with one of the communication standards mentioned above. In a non-limiting exemplary scenario, the first receiver module 110 may be adapted to receive and process a Bluetooth signal. In another non-limiting exemplary scenario, the first receiver module 110 may be adapted to receive and process a WLAN signal (or both Bluetooth and WLAN signals). In another non-limiting exemplary scenario, the first receiver module 110 may be adapted to receive and process a cellular telephony signal (e.g., a GSM or CDMA signal).

The first receiver module 110 may be adapted to consume a first amount of power while processing the received communication signal. Such processing generally includes any of a variety of activities related to receiving a communication signal and is not limited to digital signal processing. For example, such processing may comprise, amplifying, analog filtering and mixing a received communication signal. Also for example, such processing may comprise frequency synthesizing, synchronizing, phase locking, etc. Additionally for example, such processing may comprise demodulating, sampling, analog-to-digital converting, digital filtering, decoding, decompressing, decrypting, error correcting and any of a variety of other processing activities associated with a received communication signal.

The first receiver module 110 may be adapted to operate in at least one sleep mode and in a "normal" mode, where the first receiver module 110 generally receives and processes a communication signal. While operating in the normal mode, the first receiver module 110 may, for example, be adapted to perform general communication activities typically associated with the received communication signal while consuming a first amount of power.

A sleep mode may be characterized by any of a variety of operating characteristics generally associated with operation in one or more types of sleep states. For example, a sleep mode may be characterized by performing no processing or performing processing at a reduced processing rate. Also for example, a sleep mode may be characterized by periodic waking. Further for example, a sleep mode may be characterized by reduced voltage and/or current supply operation. Still further for example, a sleep mode may be characterized by shutting off power to all of, or a portion of, a module.

The exemplary mobile communication device 100 may also comprise a second receiver module 120 that is adapted to receive at least one communication signal through the antenna 105. Though the exemplary mobile communication device 100 shows the first receiver module 110 and the second receiver module 120 sharing the antenna 105, the first and second receiver modules 110, 120 may each be associated with different antennas.

The communication signal may, for example, be characterized by the first set of communication signal characteristics (e.g., similar to the communication signal received by the first receiver module 110). That is, the second receiver module 120 may be adapted to receive and process the same type of communication signal(s) that the first receiver module 110 is adapted to receive and process. As with the first receiver module 110, the second receiver module 120 may be adapted to receive any of a variety of signals associated with various communication media. Also, the second receiver module 120 may be adapted to receive a communication signal associated with any of a variety of communication protocols.

In a non-limiting exemplary scenario, the first receiver module 110 may be adapted to receive and process a Bluetooth signal, and the second receiver module 120 may be adapted to receive and process a Bluetooth signal. In another non-limiting exemplary scenario, the first receiver module 110 may be adapted to receive and process a WLAN signal (or both Bluetooth and WLAN signals), and the second receiver module 120 may be adapted to receive and process a WLAN signal (or both Bluetooth and WLAN signals). In yet another non-limiting exemplary scenario, the first receiver module 110 may be adapted to receive and process a cellular telephony signal (e.g., a GSM and/or CDMA signal), and the second receiver module 120 may be adapted to receive and process a cellular telephony signal (e.g., a GSM and/or CDMA signal).

The second receiver module 120 may be adapted to consume a second amount of power while processing the received communication signal. The second amount of power may, for example, be less (e.g., significantly less from a power consumption perspective) than the first amount of power consumed by the first receiver module 110 while processing the same signal or a similar signal. In a non-limiting exemplary scenario, the second amount of power may be at least 10% less than the first amount of power. In another non-limiting exemplary scenario, the second amount of power may be at least 20% or 30% less than the first amount of power. In yet another non-limiting exemplary scenario, the second amount of power may be at least 50% or 80% less than the first amount of power.

The second receiver module 120 may be adapted to perform any or all of the processing discussed previously with regard to the first receiver module 110. Note, however, that the second receiver module 120 may be adapted to perform any or all of the previously discussed processing at a reduced power consumption level relative to the first receiver module 110. The following discussion will now present various non-limiting exemplary illustrations of how the second receiver module 120 might be adapted to perform processing similar to the first receiver module 110, but at a generally reduced level of power consumption.

In a first exemplary scenario, the first receiver module 110 may utilize a frequency synthesizer (or generator) that generates a signal characterized by a first quality level, and the second receiver module 120 may utilize a frequency synthesizer that generates a signal characterized by a second quality level that is less than the first quality level. Such quality levels may, for example, comprise indications of frequency accuracy, frequency stability, noise level and/or any of a variety of characteristics associated with frequency synthesizer (or generator) quality. For example, the second receiver module 120 may utilize a frequency synthesizer characterized by less frequency accuracy (or less stability or more noise) than the first receiver module 110, but which consumes less power during operation. Utilizing a generally lower-quality frequency synthesizer (or generator) may correspond to lower power consumption in the second receiver module 120 relative to the first receiver module 110. For example, utilizing a generally lower quality phase lock loop circuit may correspond to lower power consumption in the second receiver module 120 relative to the first receiver module 110.

In a second exemplary scenario, the first receiver module 110 may utilize one or more A/D converters that perform at a first performance (or quality) level, and the second receiver module 120 may utilize one or more corresponding A/D converters that perform at a second performance (or quality) level that is less than the first performance (or quality) level. Such performance levels may, for example, comprise indications of bit resolution, noise level, temporal resolution (or sample rate) and/or any of a variety of performance characteristics associated with A/D converters. For example, the second receiver module 120 may utilize one or more A/D converters that have a lower number of bits (or quantization levels) than corresponding A/D converters of the first receiver module 110. Such A/D converters may, for example consume less power than their higher-bit (or higher quantization level) counterparts. Also for example, the second receiver module 120 may utilize one or more A/D converters that have a reduced sampling rate (or temporal resolution) relative to corresponding A/D converters utilized by the first receiver module 110. Such a lower sampling rate may, for example, correspond generally to lower power consumption. Further for example, the second receiver module 120 may utilize one or more A/D converters that have generally higher noise than corresponding A/D converters utilized by the first receiver module 110. Allowing relatively higher noise may (e.g., by allowing for the utilization of different A/D circuitry) correspond to relatively lower power consumption.

In a third exemplary scenario, the first receiver module 110 may utilize one or more filters (e.g., analog and/or digital filters) that perform at a first performance (or quality) level, and the second receiver module 120 may utilize one or more corresponding filters that perform at a second performance (or quality) level that is less than the first performance (or quality) level. Such performance levels may, for example, comprise indications of noise level, filtering accuracy or effectiveness, frequency band-stop or band-pass roll-off, etc. For example, the second receiver module 120 may utilize one or more filters that have a slower frequency attenuation roll-off than corresponding filters of the first receiver module 110. Also for example, the second receiver module 120 may utilize one or more digital filters having a lower number of taps, than corresponding filters of the first receiver module 110. Utilizing a filter with a lower number of taps might (e.g., by reducing components and amount of processing) corresponding to relatively lower power consumption. Note also that for additional power savings, the second receiver module 120 may omit various filters (or other components) that are utilized in the first receiver module 110.

In a fourth exemplary scenario, the first receiver module 110 may utilize a first amount of digital signal processing to process a communication signal, and the second receiver module 120 may utilize a second amount of digital signal processing to process a similar communication signal, where the second amount of digital signal processing is less than the first amount of digital signal processing. Such digital signal processing may comprise characteristics of any of a variety of types of digital signal processing. For example and without limitation, such digital signal processing may comprise performing FFT/DFFT processing, decoding, decryption, error correction, etc. For example, the second receiver module 120 may perform less decoding (e.g., lower accuracy decoding or lower resolution decoding) than the first receiver module 110. Also for example, the second receiver module 120 may be adapted to perform less (or no) error correction than the first receiver module 110. Additionally for example, the second receiver module 120 may be adapted to perform signal processing at a lower speed (e.g., a lower clock rate) than the first receiver module 110. Further for example, the second receiver module 120 may be adapted to perform signal processing at a lower bit resolution than the first receiver module 110. Such reduced processing might generally correspond to lower power consumption.

In a fifth exemplary scenario, the first receiver module 110 may utilize one or more components constructed using a first technology (e.g., a first semiconductor technology), and the second receiver module 120 may utilize one or more components constructed using a second technology, where the second technology is more energy-efficient than the first technology. For example, the second receiver module 120 may comprise one or more components that are constructed utilizing device technologies, where such components might operate at a relatively lower performance but at a relatively higher level of energy-efficiency.

In a sixth exemplary scenario, the first receiver module 110 may be adapted to provide power to various components (e.g., voltage and/or current) at first power supply levels, and the second receiver module 120 may be adapted to provide power to various corresponding components at second power supply levels that are generally lower than the first power supply levels. For example, the first receiver module 110 may provide voltage to one or more electrical components at a first voltage level, and the second receiver module 120 may generally provide power to one or more corresponding electrical components at a second voltage level that is at least 5% (or 10%, 20%, 25%, etc.) lower than the first voltage level. Such power supply difference may, for example, correspond to relatively reduced performance level at a relatively reduced level of power consumption.

As mentioned previously, the prior exemplary scenarios are merely illustrative. Accordingly, the scope of various aspects of the present invention should not be limited by characteristics of any of the previous examples.

As mentioned previously, the first receiver module 110 may be generally adapted to perform general communications between the mobile communication device 100 and other communicating devices. The second receiver module 120 may, for example and without limitation, be specifically adapted to perform packet detection. In such an adaptation, the second receiver module 120 may be adapted to perform such packet detection utilizing a minimum amount of electrical power (or energy).

In a non-limiting exemplary scenario, the second receiver module 120 may be adapted to operate continuously (e.g., while the mobile communication device 100 is operating). In another non-limiting scenario, the second receiver module 120 may (e.g., similar to the first receiver module 110), be adapted to operate in at least one sleep mode. Various sleep mode characteristics were discussed previously. By way of non-limiting example, the second receiver module 120 may be adapted to enter sleep mode and periodically wake to receive and process a communication signal. Also for example, the second receiver module 120 may be adapted to enter sleep mode and exit sleep mode in response to a real-time operation condition.

The mobile communication device 100 may, in various non-limiting exemplary configurations, comprise a sleep mode control module 130. The sleep mode control module 130 may generally be adapted to control sleep mode characteristics of the first receiver module 110 (and, in various configurations, the second receiver module 120). The sleep mode control module 130 may, for example, be implemented in hardware, software or a combination thereof.

The sleep mode control module 130 may, for example, be adapted to analyze a communication signal (e.g., as received by the second receiver module 120) to determine whether to operate the first receiver module 110 in a sleep mode or in a non-sleep (or "normal") mode. For example, the sleep mode control module 130 may be adapted to analyze information obtained from the communication signal by the second receiver module 120. The sleep mode control module 130 may then, based at least in part on such information, determine whether to operate the first receiver module 110 in a sleep mode or in a non-sleep mode.

The sleep mode control module 130 may be adapted to analyze any of a variety of types of information that may be communicated by a received communication signal. For example and without limitation, such information may comprise information identifying a source of the communication signal. Such information may, for example, identify an original sender of a communication signal or may identify an intermediate communicator of a communication signal (e.g., a communication network or an access point). In a non-limiting exemplary scenario, the sleep mode control module 130 might only wake the first receiver module 110 in response to a signal received from a particular source. In another non-limiting exemplary scenario, the sleep mode control module 130 might only wake the first receiver module 110 in response to a communication received from any of a number of sources listed in a user-defined profile.

Such information may also, for example, comprise information identifying a destination of a communication. For example, such information may identify a particular intended recipient (e.g., the mobile communication device 100) of a communication signal or a group of recipients (e.g., an email group, subscriber group, etc.). In a non-limiting exemplary scenario, the sleep mode control module 130 might only determine to operate the first receiver module 110 in a non-sleep mode in response to a communication identifying the mobile communication device 100 as a specific intended recipient of the communication.

Such information may also, for example, comprise information indicating whether a message is awaiting delivery to the mobile communication device 100. For example, a communication network may store messages for the mobile communication device 100 at an access point or a central location until the mobile communication device 100 exits sleep mode. In such an exemplary scenario, the sleep mode control module 130 may analyze information obtained from a communication signal, where such information indicates that a message is awaiting delivery to the mobile communication device 100. In response, the sleep mode control module 130 might determine to operate the first receiver module 110 in a non-sleep mode to retrieve the awaiting message(s) from the communication network.

Such information may additionally, for example, comprise information indicating the initiation of a peer-to-peer communication (e.g., a telephone or videophone call). For example, the sleep mode control module 130 may determine a telephone call communication is arriving at the mobile communication device 100 and wake the first receiver module 110 to process the incoming telephone call. Such information may further, for example, comprise information indicating urgency of a communication. For example, the sleep mode control module 130 might analyze such information and determine that an incoming communication is not urgent enough to warrant waking the first receiver module 110.

The previous information examples are merely illustrative. Accordingly, the scope of various aspects of the present invention should not be limited by characteristics of any of the previous examples or by any particular information that may be communicated in a signal, received by a receiver, or analyzed to determine whether to operate in a sleep or non-sleep mode.

Figure 2A:
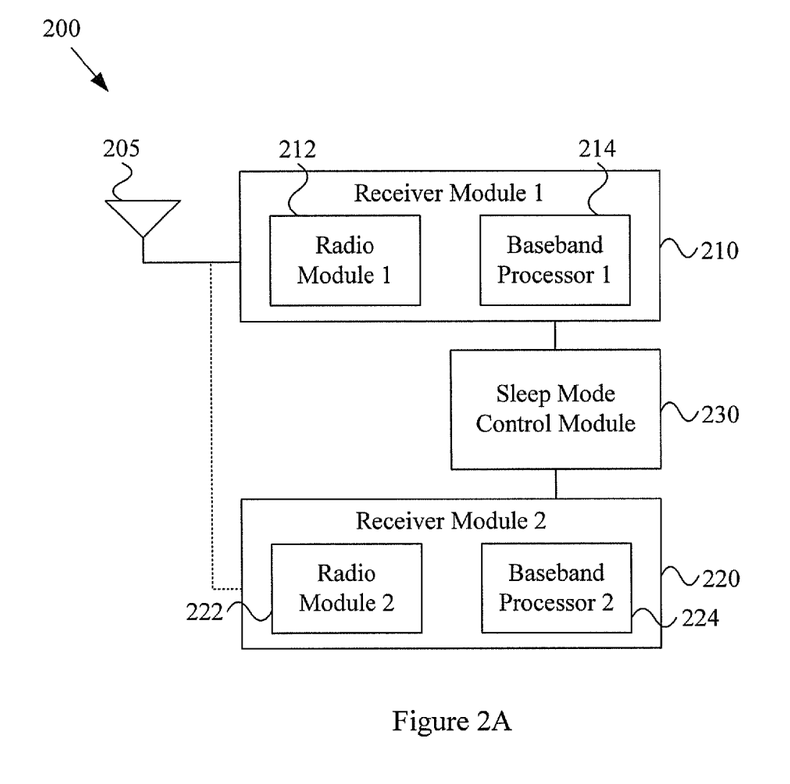
FIG. 2A is a diagram illustrating a portion of a second exemplary mobile communication device, in accordance with various aspects of the present invention.

FIG. 2A is a diagram illustrating a portion of a second exemplary mobile communication device 200, in accordance with various aspects of the present invention. The exemplary mobile communication device 200 may, for example and without limitation, share any or all characteristics with the exemplary mobile communication device 100 illustrated in FIG. 1 and discussed previously.

As mentioned previously in the discussion of FIG. 1, various modules may be independent or may share various portions. FIG. 2A illustrates an exemplary configuration where the first receiver module 210, the second receiver module 220 and the sleep mode control module 230 are independent.

The exemplary mobile communication device 200 may comprise a first receiver module 210 that is adapted to receive at least one communication signal through an antenna 205. The first receiver module 210 may, for example and without limitation, share any or all of the characteristics of the first receiver module 110 illustrated in FIG. 1 and discussed previously.

The communication signal may, for example, be characterized by a first set of communication signal characteristics (e.g., associated with any of a variety of communication media or any of a variety of communication protocols). The first receiver module 210 may, for example, comprise a first radio module 212 and a first baseband processor 214. The first radio module 212 may, for example, receive an RF communication signal from the antenna 205 and convert the received RF communication signal to a baseband communication signal. The first baseband processor 214 may then process the baseband communication signal to determine information communicated by the baseband communication signal.

The first receiver module 210 may be adapted to consume a first amount of power while processing a received communication signal. For example, the first radio module 212 may be generally adapted to consume a particular amount of respective power while processing a received communication signal, and the first baseband processor 214 may also be adapted to consume a particular amount of respective power while processing a received communication signal.

The first receiver module 210 may be adapted to operate in at least one sleep mode and a non-sleep mode. For example, the first radio module 212 (or portions thereof) may be adapted to operate in at least one sleep mode and a non-sleep mode. Also for example, the first baseband processor 214 (or portions thereof) may be adapted to operate in at least one sleep mode and a non-sleep mode. Various characteristics of sleep mode and non-sleep mode operation were discussed previously.

The exemplary mobile communication device 200 may also comprise a second receiver module 220 that is adapted to receive at least one communication signal through the antenna 205. The second receiver module 220 may, for example and without limitation, share any or all characteristics with the second receiver module 120 illustrated in FIG. 1 and discussed previously.

Though the exemplary mobile communication device 200 shows the first receiver module 210 and the second receiver module 220 sharing the antenna 205, the first and second receiver modules 210, 220 may each be associated with separate respective antennas.

The communication signal may, for example, be characterized by the first set of communication signal characteristics. That is, the second receiver module 220 may be adapted to receive and process the same type of communication signal(s) that the first receiver module 210 is adapted to receive and process.

The second receiver module 220 may, for example, comprise a second radio module 222 and a second baseband processor 224. The second radio module 222 may, for example, receive an RF communication signal from the antenna 205 and convert the received RF communication signal to a baseband communication signal. The second baseband processor 224 may then process the baseband communication signal to determine information communicated by the baseband communication signal. In the exemplary mobile communication device 200 illustrated in FIG. 2A, the first radio module 212 and the second radio module 222 are independent, and the first baseband processor 214 and the second baseband processor 224 are independent. As will be illustrated later, such independence is not necessary.

The second receiver module 220 may be adapted to consume a second amount of power while processing a received communication signal. For example, the second radio module 222 may be generally adapted to consume a particular amount of respective power while processing a received communication signal, and the second baseband processor 224 may also be adapted to consume a particular amount of respective power while processing a received communication signal. The second amount of power may, for example, be less (e.g., significantly less from a power consumption perspective) than the first amount of power consumed by the first receiver module 210 while processing the same communication signal or a similar communication signal.

The second receiver module 220 may also, in various exemplary scenarios, be adapted to operate in at least one sleep mode and a non-sleep mode. For example, the second radio module 222 (or portions thereof) may be adapted to operate in at least one sleep mode and a non-sleep mode. Also for example, the second baseband processor 224 (or portions thereof) may be adapted to operate in at least one sleep mode and a non-sleep mode. Various characteristics of sleep mode and non-sleep mode operation were discussed previously.

The exemplary mobile communication device 200 may also comprise a sleep mode control module 230. The sleep mode control module 230 may share any or all characteristics with the sleep mode control module 130 illustrated in FIG. 1 and discussed previously. For example, the sleep mode control module 230 may generally be adapted to control sleep mode characteristics of the first receiver module 210 (and, in various configurations, the second receiver module 220).

The sleep mode control module 230 may, for example, be adapted to analyze a communication signal (e.g., as received by the second receiver module 220) to determine whether to operate the first receiver module 210 in a sleep mode or in a non-sleep (or "normal") mode. For example, the sleep mode control module 230 may be adapted to analyze information obtained from the communication signal by the second receiver module 220. The sleep mode control module 230 may then, based at least in part on such information, determine whether to operate the first receiver module 210 in a sleep mode or in a non-sleep mode.

In the exemplary configuration illustrated in FIG. 2A, the sleep mode control module 230 is independent of the first receiver module 210 (e.g., including the first radio module 212 and the first baseband processor 214) and the second receiver module 220 (e.g., including the second radio module 222 and the second baseband processor 224). As will be illustrated later, such independence is not necessary. The sleep mode control module 230 may be implemented in hardware, software or a combination thereof.

Figure 2B:
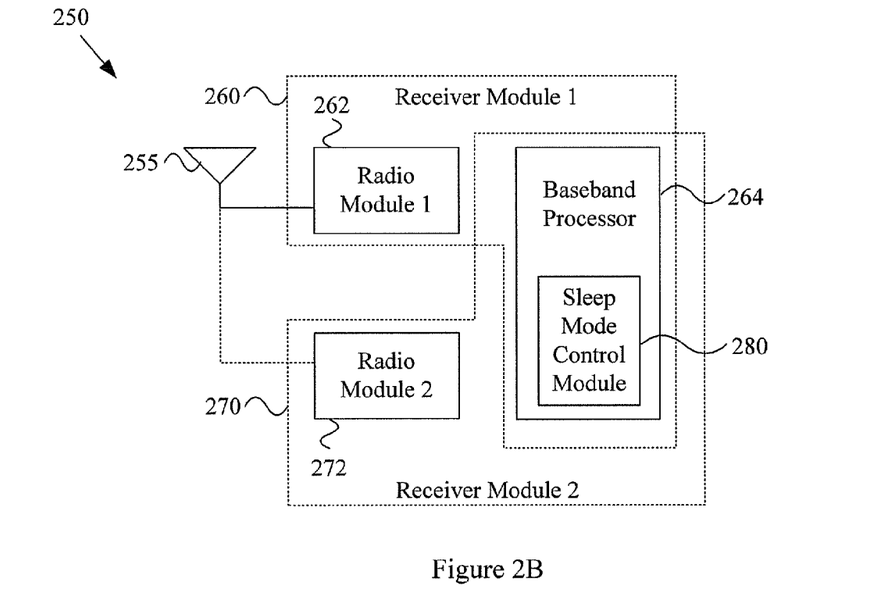
FIG. 2B is a diagram illustrating a portion of a third exemplary mobile communication device, in accordance with various aspects of the present invention.

FIG. 2B is a diagram illustrating a portion of a third exemplary mobile communication device 250, in accordance with various aspects of the present invention. The exemplary communication device 250 may, for example and without limitation, share various characteristics with the exemplary mobile communication devices 100, 200 illustrated in FIGS. 1-2A and discussed previously.

As mentioned previously in the discussion of FIG. 1, various modules may be independent or may share various portions. FIG. 2B illustrates an exemplary configuration where the first receiver module 260 and the second receiver module 270 comprise independent respective radio modules 262, 272 and share a baseband processor 264.

The first radio module 262 and the second radio module 272 may, for example and without limitation, share various characteristics with the exemplary radio modules 212, 222 illustrated in FIG. 2A and discussed previously. The first and second radio modules 262, 272 may, for example, be communicatively coupled to the baseband processor 264 through dedicated lines, a shared bus or through any of a variety of switching or multiplexing circuitry.

The baseband processor 264 may, for example and without limitation, share various characteristics with the exemplary baseband processors 214, 224 illustrated in FIG. 2A and discussed previously. The baseband processor 264 may, for example, comprise various hardware and/or software components with the previously discussed baseband processors 214, 224.

In a non-limiting exemplary scenario, the baseband processor 264 may be adapted to process a received baseband communication signal differently depending on whether the baseband communication signal was received from the first radio module 262 or the second radio module 272. Such different processing may, for example, be implemented utilizing different hardware, programmable hardware or different software. The baseband processor 264 may, for example, be adapted to process a baseband communication signal received from the second radio module 272 utilizing lower power than when processing the same or similar baseband communication signal received from the first radio module 262.

In another non-limiting exemplary scenario, the baseband processor 264 may be adapted to always process a received baseband communication signal in the same manner, regardless of which radio module 262, 272 provides the baseband communication signal. In such an exemplary scenario, the second receiver module 270 may be adapted to utilize less power than the first receiver module 262 through the utilization of different respective radio modules 262, 272.

The exemplary mobile communication device 250 may also comprise a sleep mode control module 280. The sleep mode control module 280 may, for example and without limitation, share various characteristics with the sleep mode control modules, 130, 230 illustrated in FIGS. 1-2A and discussed previously.

In the exemplary configuration illustrated in FIG. 2B, the sleep mode control module 280 is implemented in the baseband processor 280. The sleep mode control module 280 may, for example, be implemented in the baseband processor 280 with dedicated and/or shared components (e.g., hardware and/or software components). The sleep mode control module 280 may, for example, be communicatively coupled to the first radio module 262 and/or the second radio module 272 through dedicated lines and/or a shared communication bus.

The sleep mode control module 280 may, for example, be adapted to analyze a communication signal (e.g., as received by the second radio module 272 of the second receiver module 270) to determine whether to operate the first receiver module 210 (e.g., the first radio module 262 and/or the shared baseband processor 264 or portions thereof) in a sleep mode or in a non-sleep mode. For example, the sleep mode control module 280 may be adapted to analyze information obtained from the communication signal by the second receiver module 270. The sleep mode control module 280 may then, based at least in part on such information, determine whether to operate the first receiver module 260 (e.g., the first radio module 262 and/or the shared baseband processor 264 or portions thereof) in a sleep mode or in a non-sleep mode.

Figure 3:
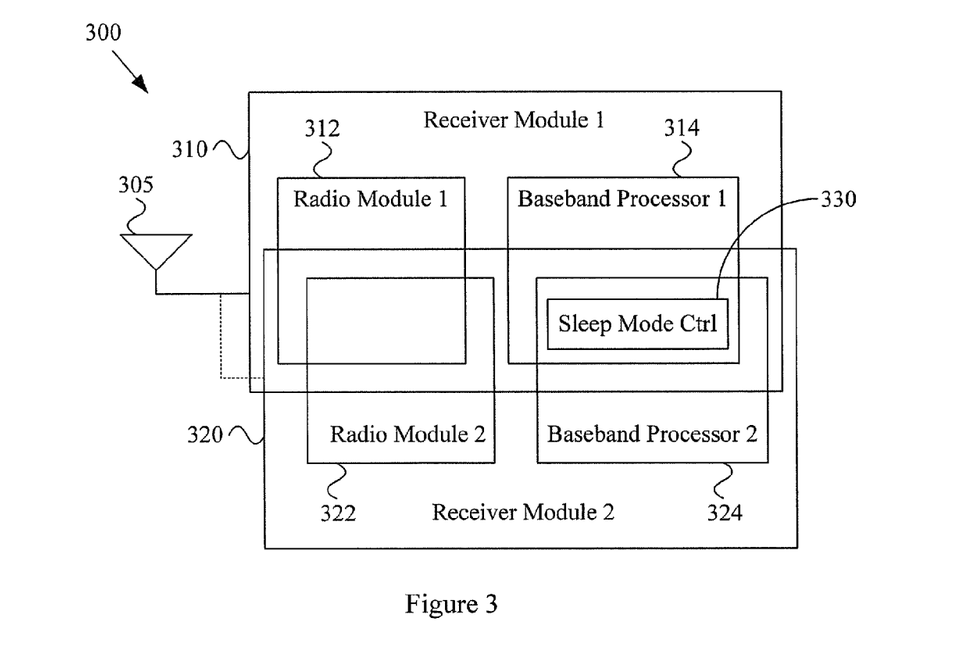
FIG. 3 is a diagram illustrating a portion of a fourth exemplary mobile communication device, in accordance with various aspects of the present invention.

FIG. 3 is a diagram illustrating a portion of a fourth mobile communication device 300, in accordance with various aspects of the present invention. The exemplary mobile communication device 300 may, for example and without limitation, share any or all characteristics with the exemplary mobile communication devices 100, 200, 250 illustrated in FIGS. 1-2B and discussed previously.

As mentioned previously in the discussion of FIGS. 1-2B, various modules of a mobile communication device may be independent or may share various portions. FIG. 3 illustrates an exemplary configuration where the first receiver module 310, the second receiver module 320 and the sleep mode control module 330 are at least partially integrated (i.e., they share are least a portion of their hardware and/or software with each other).

Note that taking the exemplary mobile communication device 300 illustrated in FIG. 3 to the extreme, the first and second receiver modules may share all of (or virtually all of) their components. Such a configuration may, for example, be realized in various programmable radio configurations.

The exemplary mobile communication device 300 may comprise a first receiver module 310 that is adapted to receive at least one communication signal through an antenna 305. The first receiver module 310 may, for example and without limitation, share various characteristics with the first receiver modules 110, 210, 260 illustrated in FIGS. 1-2B and discussed previously.

The communication signal may, for example, be characterized by a first set of communication signal characteristics (e.g., associated with any of a variety of communication media or any of a variety of communication protocols). The first receiver module 310 may, for example, comprise a first radio module 312 and a first baseband processor 314. The first radio module 312 may, for example, receive an RF communication signal from the antenna 305 and convert the received RF communication signal to a baseband communication signal. The first baseband processor 314 may then process the baseband communication signal to determine information communicated by the baseband communication signal.

The first receiver module 310 may be adapted to consume a first amount of power while processing a received communication signal. For example, the first radio module 312 may be generally adapted to consume a particular amount of respective power while processing a received communication signal, and the first baseband processor 314 may also be adapted to consume a particular amount of respective power while processing a received communication signal.

The first receiver module 310 may be adapted to operate in at least one sleep mode and a non-sleep mode. For example, the first radio module 312 (or portions thereof) may be adapted to operate in at least one sleep mode and a non-sleep mode. Also for example, the first baseband processor 314 (or portions thereof) may be adapted to operate in at least one sleep mode and a non-sleep mode. Various characteristics of sleep mode and non-sleep mode operation were discussed previously.

The exemplary mobile communication device 300 may also comprise a second receiver module 320 that is adapted to receive at least one communication signal through the antenna 305. The second receiver module 320 may, for example and without limitation, share any or all characteristics with the second receiver modules 120, 220, 270 illustrated in FIGS. 1-2B and discussed previously.

Though the exemplary mobile communication device 300 shows the first receiver module 310 and the second receiver module 320 sharing the antenna 305, the first and second receiver modules 310, 320 may each be associated with separate respective antennas.

The communication signal may, for example, be characterized by the first set of communication signal characteristics. That is, the second receiver module 320 may be adapted to receive and process the same type of communication signal(s) that the first receiver module 310 is adapted to receive and process.

The second receiver module 320 may, for example, comprise a second radio module 322 and a second baseband processor 324. The second radio module 322 may, for example, receive an RF communication signal from the antenna 305 and convert the received RF communication signal to a baseband communication signal. The second baseband processor 324 may then process the baseband communication signal to determine information communicated by the baseband communication signal.

In the exemplary mobile communication device 300 illustrated in FIG. 3, the first radio module 312 and the second radio module 322 are at least partially integrated. This is illustrated by the overlapping blocks. Such partial integration may comprise characteristics of hardware and/or software integration. By way of non-limiting illustration, the first radio module 312 and the second radio module 322 may share any of a variety of components (e.g., filters, amplifiers, oscillators, phase locking circuitry, mixers, etc.).

Such shared components may, for example, be coupled utilizing any of a variety of switching circuits that provide for shared components to be switched in and out of the first radio module 312 and the second radio module 322. Such shared components may also, for example, be adjustable. For example, a shared component may be adjustable to operate differently with the first radio module 312 and the second radio module 322. For example, a shared amplifier may have adjustable gain, noise and linearity settings. Also for example, a shared filter may comprise different gain, noise and frequency-pass/stop settings. Further for example, a shared frequency generating circuit may comprise different accuracy or stability settings. For example, a shared component may be switchable between relatively high-power operation for utilization with the first radio module 312 and relatively low-power operation for utilization with the second radio module 322.

In the exemplary mobile communication device 300 illustrated in FIG. 3, the first baseband processor 314 and the second baseband processor 324 are also at least partially integrated. This is illustrated by the overlapping blocks. Such partial integration may comprise characteristics of hardware and/or software integration. By way of non-limiting illustration, the first baseband processor 314 and the second baseband processor 324 may share any of a variety of components (e.g., A/D converters, digital signal processing circuitry, decoders, decrypters, demodulators, etc.). Also for example, the first and second baseband processors 314, 324 may share various software modules.

Such share components may, for example, be coupled utilizing any of a variety of switching circuits (or software) that provide for shared components to be switched in and out of the first baseband processor 314 and the second baseband processor 324. Such shared components may also, for example, be adjustable. For example, a shared component may be adjustable to operate differently with the first baseband processor 314 and the second baseband processor 324. For example, a shared A/D converter may have adjustable sample rate, bit resolution or noise settings. Also for example, a shared digital signal processing circuit may comprise different clock speed or processing rate settings. Further for example, a shared decoder may comprise different accuracy or reliability settings. For example, a shared component may be switchable between relatively high-power operation for utilization with the first baseband processor 314 and relatively low-power operation for utilization with the second baseband processor 324.

The second receiver module 320 may be adapted to consume a second amount of power while processing a received communication signal. For example, the second radio module 322 may be generally adapted to consume a particular amount of respective power while processing a received communication signal, and the second baseband processor 324 may also be adapted to consume a particular amount of respective power while processing a received communication signal. The second amount of power may, for example, be less (e.g., significantly less from a power consumption perspective) than the first amount of power consumed by the first receiver module 310 while processing the same communication signal or a similar communication signal.

The second receiver module 320 may also, in various exemplary scenarios, be adapted to operate in at least one sleep mode and a non-sleep mode. For example, the second radio module 322 (or portions thereof) may be adapted to operate in at least one sleep mode and a non-sleep mode. Also for example, the second baseband processor 324 (or portions thereof) may be adapted to operate in at least one sleep mode and a non-sleep mode. Various characteristics of sleep mode and non-sleep mode operation were discussed previously.

The exemplary mobile communication device 300 may also comprise a sleep mode control module 330. The sleep mode control module 330 may share any or all characteristics with the sleep mode control modules 130, 230, 280 illustrated in FIGS. 1-2B and discussed previously. For example, the sleep mode control module 330 may generally be adapted to control sleep mode characteristics of the first receiver module 310 (and, in various configurations, the second receiver module 320).

The sleep mode control module 330 may, for example, be adapted to analyze a communication signal (e.g., as received by the second receiver module 320) to determine whether to operate the first receiver module 310 in a sleep mode or in a non-sleep (or "normal") mode. For example, the sleep mode control module 330 may be adapted to analyze information obtained from the communication signal by the second receiver module 320. The sleep mode control module 330 may then, based at least in part on such information, determine whether to operate the first receiver module 310 in a sleep mode or in a non-sleep mode.

In the exemplary configuration illustrated in FIG. 3, the sleep mode control module 330 is implemented in components (e.g., hardware and/or software) shared by the first baseband processor 314 and the second baseband processor 324. The sleep mode control module 330 may be implemented in hardware, software or a combination thereof.

Figure 4:
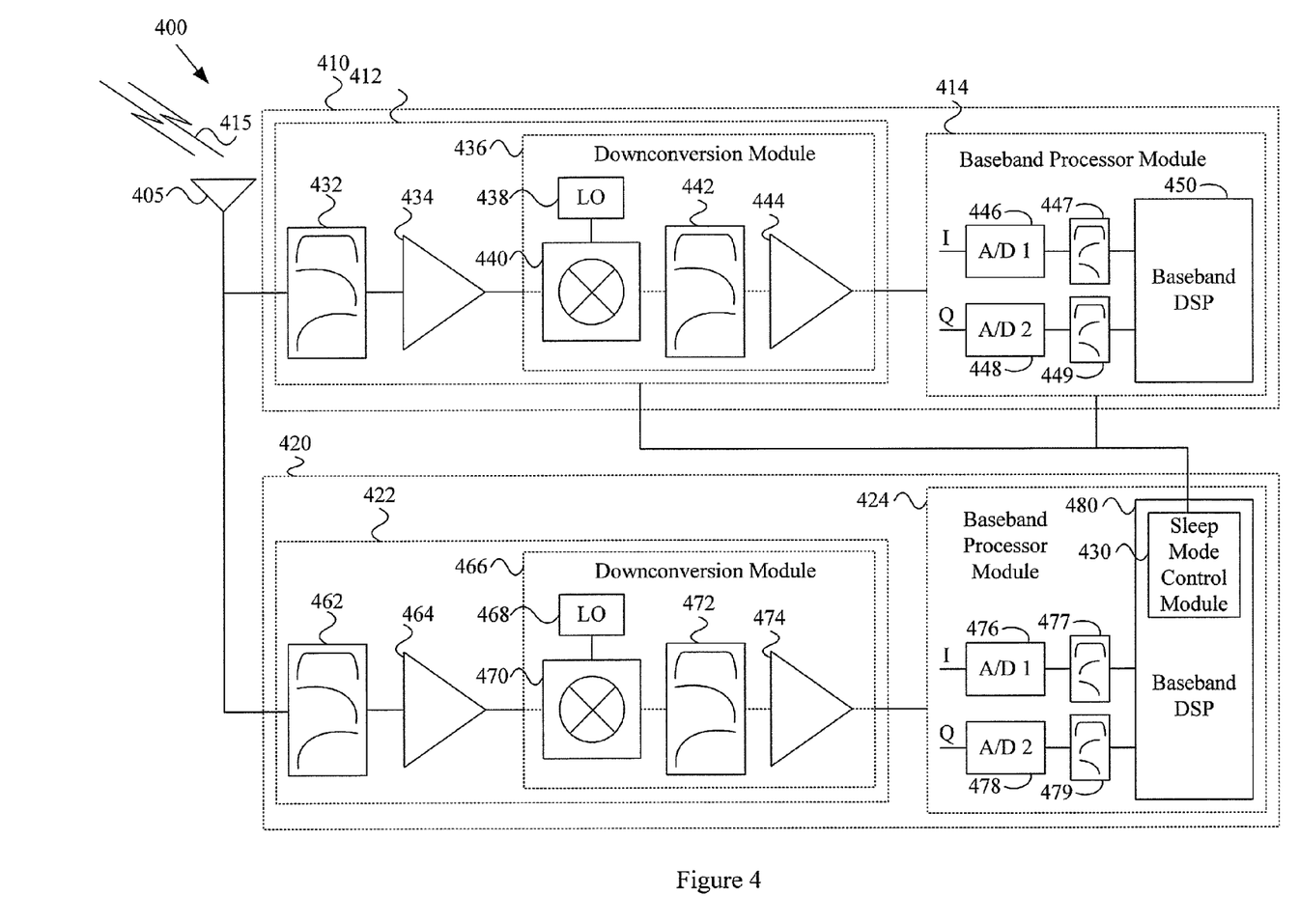
FIG. 4 is a diagram illustrating a portion of a fifth exemplary mobile communication device, in accordance with various aspects of the present invention.

FIG. 4 is a diagram illustrating a portion of a fifth mobile communication device 400, in accordance with various aspects of the present invention. The exemplary mobile communication device 400 is illustrated to provide non-limiting examples of various sub-components of receiving module hardware and/or software previously discussed at a higher level. It should be understood that the exemplary mobile communication device 400 is merely exemplary and the scope of various aspects of the present invention should not be limited by particular characteristics of the exemplary mobile communication device 400.

As mentioned previously in the discussion of FIG. 1, various modules may be independent or may share various portions. FIG. 4 illustrates an exemplary configuration where the first receiver module 410 and the second receiver module 420 are independent, and the sleep mode control module 430 is integrated with the second receiver module 420.

The exemplary mobile communication device 400 may comprise a first receiver module 410 that is adapted to receive at least one communication signal through an antenna 405. The first receiver module 410 may, for example and without limitation, share any or all of the characteristics with the first receiver modules 110, 210, 260, 310 illustrated in FIGS. 1-3 and discussed previously. The communication signal may, for example, be characterized by a first set of communication signal characteristics (e.g., associated with any of a variety of communication media or any of a variety of communication protocols).

The first receiver module 410 may, for example, comprise a first radio module 412 and a first baseband processor 414. The first radio module 412 may, for example, comprise a filter 432, an amplifier 434 and a downconversion module 436, which comprises a local oscillator 438, mixer 440, filter 442 and amplifier 444. The first baseband processor 414 may, for example, comprise a first A/D converter 446, first filter 447, second A/D converter 448, second filter 449 and a baseband digital signal processor 450.

The first radio module 412 may, for example, receive an RF communication signal from the antenna 405. The first radio module 412 may then filter the RF communication signal with the filter 432 and amplify the filtered RF communication signal with the amplifier 434 (e.g., a low-noise amplifier). The mixer 440 of the downconversion module 436 receives the amplified RF communication signal from the amplifier 434 and mixes the amplified RF communication signal with a signal from the local oscillator 438. The mixed signal output from the mixer 440 is then filtered by the filter 442 and amplified by the amplifier 444. The downconversion module 436 then outputs a baseband communication signal. Though the output signal is illustrated as one line, in this exemplary scenario, the downconversion module 436 actually outputs I and Q components of the baseband communication signal. Thus, the downconversion module 436 may also comprise additional mixing circuitry (not shown) to generate both I and Q components of the baseband communication signal.

The first baseband processor 414 receives the I and Q baseband communication signals from the downconversion module 436 and digitizes the received I and Q baseband communication signals with a first A/D converter 446 and second A/D converter 448, respectively. The digitized I and Q baseband communication signals are then filtered by the first filter 447 and second filter 449, respectively, and passed to the baseband digital signal processor 450 for further processing. Such further processing may comprise characteristics of any of a large variety of signal processing activities, some of which were presented previously. For example and without limitation, the baseband digital signal processor 450 may be adapted to determine information carried by the baseband communication signal(s).

The first receiver module 410 may be adapted to consume a first amount of power while processing a received communication signal. For example, the components of the first radio module 412 may be generally adapted to consume respective amounts of respective power while processing a received communication signal, and the components of the first baseband processor 414 may also be adapted to consume particular amounts of respective power while processing a received communication signal.

The first receiver module 410 (or components thereof) may be adapted to operate in at least one sleep mode and a non-sleep mode. For example, the first radio module 412 (or any of the components thereof) may be adapted to operate in at least one sleep mode and a non-sleep mode. Also for example, the first baseband processor 414 (or any of the components thereof) may be adapted to operate in at least one sleep mode and a non-sleep mode. Various characteristics of sleep mode and non-sleep mode operation were discussed previously.

The exemplary mobile communication device 400 may also comprise a second receiver module 420 that is adapted to receive at least one communication signal through the antenna 405. The second receiver module 420 may, for example and without limitation, share any or all characteristics with the second receiver modules 120, 220, 270, 320 illustrated in FIGS. 1-3 and discussed previously.

Though the exemplary mobile communication device 400 shows the first receiver module 410 and the second receiver module 420 sharing the antenna 405, the first and second receiver modules 410, 420 may each be associated with separate respective antennas.

The communication signal may, for example, be characterized by the first set of communication signal characteristics. That is, the second receiver module 420 may be adapted to receive and process the same type of communication signal(s) that the first receiver module 410 is adapted to receive and process.

The second receiver module 420 may, for example, comprise a second radio module 422 and a second baseband processor 424. The second radio module 422 may, for example, comprise a filter 462, an amplifier 464 and a downconversion module 466, which comprises a local oscillator 468, mixer 470, filter 472 and amplifier 474. The second baseband processor 424 may, for example, comprise a first A/D converter 476, first filter 477, second A/D converter 478, second filter 479 and a baseband digital signal processor 480.

The second radio module 422 may, for example, receive an RF communication signal from the antenna 405. The second radio module 422 may then filter the RF communication signal with the filter 462 and amplify the filtered RF communication signal with the amplifier 464 (e.g., a low-noise amplifier). The mixer 470 of the downconversion module 466 receives the amplified RF communication signal from the amplifier 464 and mixes the amplified RF communication signal with a signal from the local oscillator 468. The mixed signal output from the mixer 470 is then filtered by the filter 472 and amplified by the amplifier 474. The downconversion module 466 then outputs a baseband communication signal. Though the output signal is illustrated as one line, in this exemplary scenario, the downconversion module 466 actually outputs I and Q components of the baseband communication signal. Thus, the downconversion module 466 may also comprise additional mixing circuitry (not shown) to generate both I and Q components of the baseband communication signal.

The second baseband processor 424 receives the I and Q baseband communication signals from the downconversion module 476 and digitizes the received I and Q baseband communication signals with a first A/D converter 466 and second A/D converter 478, respectively. The digitized I and Q baseband communication signals are then filtered by the first filter 477 and second filter 479 respectively and passed to the baseband digital signal processor 480 for further processing. Such further processing may comprise characteristics of any of a large variety of signal processing activities, some of which were presented previously. For example and without limitation, the baseband digital signal processor 480 may be adapted to determine information carried by the baseband communication signal(s).

The second receiver module 420 may be adapted to consume a second amount of power while processing a received communication signal. For example, the components of the second radio module 422 may be generally adapted to consume particular amounts of respective power while processing a received communication signal, and components of the second baseband processor 424 may also be adapted to consume particular amounts of respective power while processing a received communication signal. The second amount of power may, for example, be less (e.g., significantly less from a power consumption perspective) than the first amount of power consumed by components of the first receiver module 410 while processing the same communication signal or a similar communication signal.

As discussed previously, various components of the second receiver module 420 may be adapted to consume less power than corresponding components of the first receiver module 410. Savings in power consumption may, for example, correspond to relatively lower performance. For example and without limitation, various filters (e.g., filters 462, 472, 477 and 479) of the second receiver module 420 may be adapted to consume less power than various corresponding filters (e.g., filters 432, 442, 447 and 449) of the first receiver module 410. Also for example, various amplifiers (e.g., amplifiers 464 and 474) of the second receiver module 420 may be adapted to consume less power than various corresponding amplifiers (e.g., amplifiers 434 and 444) of the first receiver module 410. Further for example, the local oscillator 468 (and related components) of the second receiver module 420 may be adapted to consume less power than the corresponding local oscillator 438 of the first receiver module 410. Still further for example, various A/D converters (e.g., A/D converters 476 and 478) of the second receiver module 420 may be adapted to consume less power than corresponding A/D converters (e.g., A/D converters 446 and 448) of the first receiver module 410. Additionally for example, though not illustrated in FIG. 4, various components of the first receiver module 410 may also be omitted from the second receiver module 420 where unnecessary (e.g., to conserve additional power).

The exemplary mobile communication device 400 may also comprise a sleep mode control module 430. The sleep mode control module 430 may share various characteristics with the sleep mode control modules 130, 230, 280, 330 illustrated in FIGS. 1-3 and discussed previously. For example, the sleep mode control module 430 may generally be adapted to control sleep mode characteristics of the first receiver module 410 (and, in various configurations, the second receiver module 420).

The sleep mode control module 430 may, for example, be adapted to analyze a communication signal (e.g., as received by the second receiver module 420) to determine whether to operate the first receiver module 410 in a sleep mode or in a non-sleep (or "normal") mode. For example, the sleep mode control module 430 may be adapted to analyze information obtained from the communication signal by the second receiver module 420. The sleep mode control module 430 may then, based at least in part on such information, determine whether to operate the first receiver module 410 (or various components thereof) in a sleep mode or in a non-sleep mode.

In the exemplary configuration illustrated in FIG. 4, the sleep mode control module 430 is implemented in the baseband processor module 424 (e.g., executed in the baseband DSP 480) of the second receiver module 420. The sleep mode control module 430 is communicatively coupled to various components of the first receiver module 410 to control sleep mode operation of such various components. For example, the sleep mode control module 430 is communicatively coupled to various components of the first radio module 412 and to various components of the first baseband processor 414. The sleep mode control module 430 may, for example, be adapted to control sleep mode operation of any of the vast array of components that may be utilized to implement a receiver module.

The exemplary mobile communication devices 100, 200, 300, 400 illustrated in FIGS. 1-4 may be implemented utilizing any of a variety of components (e.g., hardware and/or a combination of hardware and software). Further, various portions of the exemplary communication devices 100, 200, 250, 300, 400 may be implemented in independent integrated circuits and/or integrated into a single integrated circuit. For example and without limitation, the first and second receiver modules may be integrated into a single integrated circuit. Also for example, the first and second receiver modules and the sleep mode control module may be integrated into a single integrated circuit. The scope of various aspects of the present invention should not be limited by characteristics of any particular hardware and/or software implementation or by any particular degree of integration.

Figure 5:
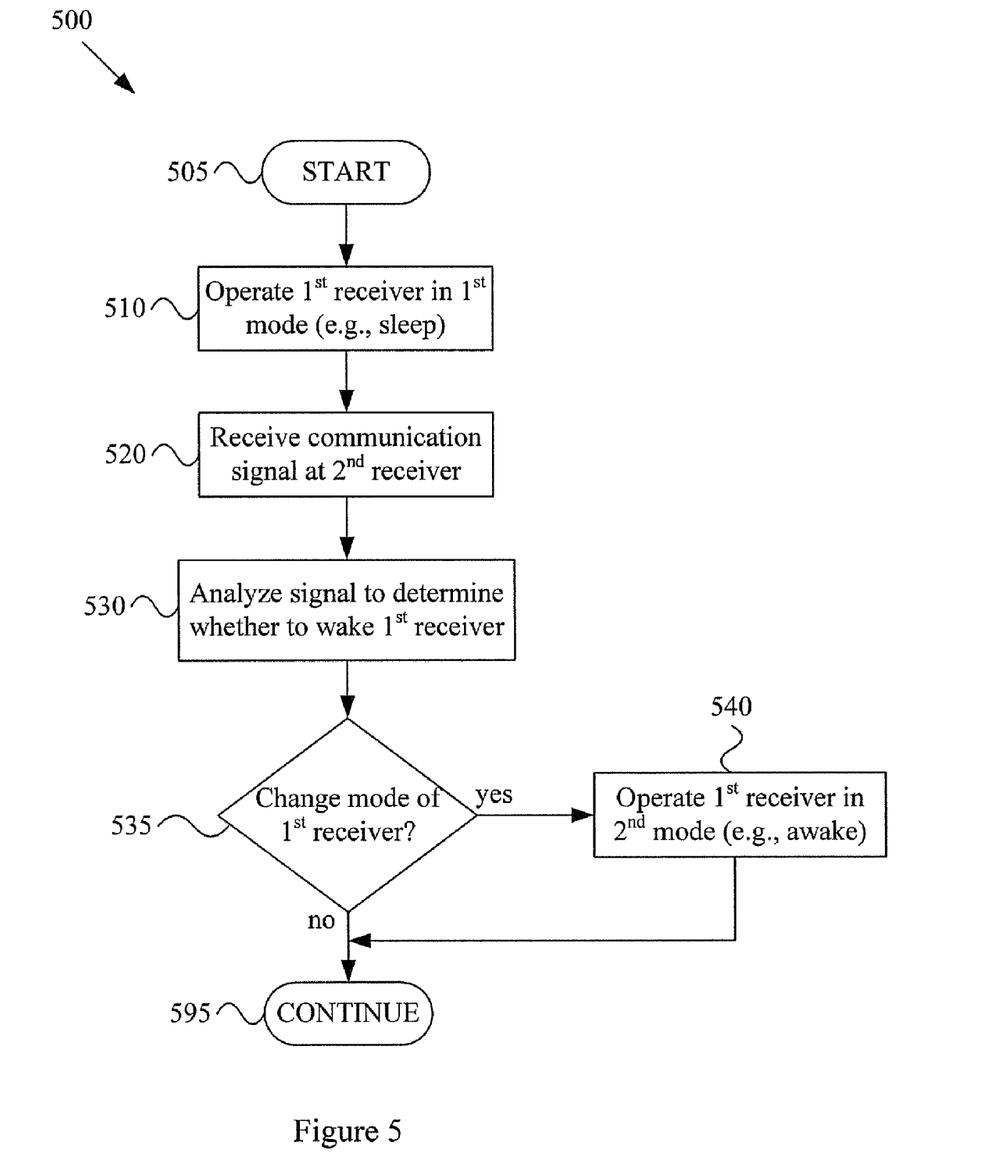
FIG. 5 is a diagram illustrating a method, in a mobile communication device, for operating the mobile communication device in an energy-efficient manner, in accordance with various aspects of the present invention.

FIG. 5 is a diagram illustrating a method 500, in a mobile communication device, for operating the mobile communication device in an energy-efficient manner, in accordance with various aspects of the present invention. The exemplary method 500 may, for example and without limitation, share any or all functional characteristics with the exemplary mobile communication devices 100, 200, 250, 300, 400 illustrated in FIGS. 1-4 and discussed previously. The mobile communication device may comprise characteristics of any of a variety of types of mobile communication devices, as discussed previously.

The exemplary method 500 may begin executing at step 505. The exemplary method 500 may begin executing for any of a variety of reasons. For example and without limitation, the exemplary method 500 may begin executing in response to powering up or resetting a mobile communication device implementing the method 500. Also for example, the exemplary method 500 may begin executing in response to a command (e.g., from a user or another communication device). Further for example, the exemplary method 500 may begin executing in response to a detected period of inactivity with a mobile communication device implementing the method 500 or in response to any of a large variety of operational conditions.

The exemplary method 500 may, at step 510, comprise operating a first receiver (or first receiver module) of the mobile communication device in a sleep mode. Various exemplary sleep mode characteristics were discussed previously. The first receiver may, for example, be adapted to, while operating in a normal (i.e., non-sleep) mode, process a communication signal characterized by a first set of communication signal characteristics. Such communication signal characteristics were also generally discussed previously. The first receiver may also, for example, be adapted to consume a first amount of power while processing such a communication signal.

The first receiver may comprise any of a variety of receiver characteristics. For example and without limitation, the first receiver may share various characteristics with the first receiver modules 110, 210, 260, 310, 410 of the exemplary mobile communication devices 100, 200, 250, 300, 400 illustrated in FIGS. 1-4 and discussed previously. For example, the first receiver may be adapted to receive any of a variety of types of communication signals (e.g., a wire signal, RF signal, tethered optical signal, non-tethered optical signal, etc.). Also for example, the first receiver may be adapted to receive a communication signal communicated in accordance with any of a variety of communication protocols. In a non-limiting exemplary scenario, the first receiver may be adapted to receive and process a Bluetooth signal. In another non-limiting exemplary scenario, the first receiver may be adapted to receive and process a WLAN signal (and/or a Bluetooth signal). In another non-limiting exemplary scenario, the first receiver may be adapted to receive and process a cellular telephony signal.

The first receiver may be adapted to operate in at least one sleep mode and in a "normal" mode, where the first receiver generally receives and processes a communication signal (e.g., consuming a first amount of power). While operating in the normal mode, the first receiver may, for example, be adapted to perform general communication activities typically associated with a received communication signal.

The exemplary method 500 may, at step 520, comprise receiving a communication signal with a second receiver module, where the communication signal is characterized by the first set of communication signal characteristics (e.g., similar to the communication signal received by the first receiver). That is, the second receiver may be adapted to receive and process the same type of communication signal(s) that the first receiver is adapted to receive and process.

For example and without limitation, the second receiver may share various characteristics with the second receiver modules 120, 220, 270, 320, 420 of the exemplary mobile communication devices 100, 200, 250, 300, 400 illustrated in FIGS. 1-4 and discussed previously. For example, as with the first receiver, the second receiver may be adapted to receive any of a variety of signals associated with various communication media. Also, the second receiver may be adapted to receive a communication signal associated with any of a variety of communication protocols.

The second receiver may be adapted to consume a second amount of power while processing the received communication signal. The second amount of power may, for example, be less (e.g., significantly less from a power consumption perspective) than the first amount of power consumed by the first receiver while processing the same communication signal or a similar communication signal. In a non-limiting exemplary scenario, the second amount of power may be at least 10% less than the first amount of power. In another non-limiting exemplary scenario, the second amount of power may be at least 20% or 30% less than the first amount of power. In yet another non-limiting exemplary scenario, the second amount of power may be at least 50% or 80% less than the first amount of power. The previous discussion of the first receiver module 110 and the second receiver module 120 of FIG. 1 presented various non-limiting exemplary scenarios including operational differences between different receivers. In general, the second receiver may utilize lower-quality components and/or perform lower-quality processing to conserve power.

Note that the first and second receivers may both be adapted to operate in one or more sleep modes and normal modes. For example, step 520 may comprise waking the second receiver from a sleep state prior to receiving the communication signal. Such waking may, for example, occur periodically or in response to an operating condition.

The first and second receivers may be independent or may share various components. The first and second receivers may, for example, be adapted to perform different primary functions. For example and without limitation, the first receiver may be generally adapted to perform general communication signal reception and processing, while the second receiver may be specifically adapted to perform communication packet detection.

The exemplary method 500 may, at step 530, comprise analyzing the received communication signal (e.g., as received and/or processed by the second receiver at step 520) to determine whether to operate the first receiver in the normal mode. Step 530 may, for example and without limitation, share any or all functional characteristics with the sleep mode control modules 130, 230, 280, 330, 430 of the exemplary mobile communication devices 100, 200, 250, 300, 400 illustrated in FIGS. 1-4 and discussed previously.

For example, step 530 may comprise analyzing information obtained from the communication signal received (and processed) by the second receiver at step 520. Step 530 may then, for example, based at least in part on the information, determine whether to operate the first receiver in a sleep mode or in a non-sleep (or "normal") mode. Such information may comprise characteristics of any of a variety of types of communication information, including without limitation, source and/or destination identification information, message waiting or incoming communication information, etc.

The exemplary method 500 may, at step 535, comprise performing flow control for execution of the method 500. For example, if step 530 comprised determining to wake the first receiver, then step 535 may direct execution flow to step 540. If, however, step 530 comprised determining not to wake the first receiver, then step 535 may direct execution flow to step 595.

The exemplary method 500 may, at step 540, comprise operating the first receiver in the normal mode. Step 530 may comprise performing any of a variety of operations associated with waking a sleeping device or module. Such variety of operations may generally depend on the particular type of sleep state in which the first receiver (or components thereof) was placed at step 510. For example and without limitation, step 540 may comprise providing a clock signal or a faster clock signal to the first receiver (or portion thereof). Also for example, step 540 may comprise turning on or increasing supplied power to the first receiver (or portion thereof). Further for example, step 540 may comprise routing signals to various components.

The exemplary method 500 may, at step 595, comprise performing continued processing. Such continued processing may comprise characteristics of any of a variety of types of continued processing. For example and without limitation, step 595 may comprise conducting general communication utilizing the first receiver. Also for example, step 595 may comprise notifying a user of an incoming communication. Additionally, for example, step 595 may comprise returning execution flow of the exemplary method 500 back up to step 520 for receiving and analyzing additional communication signals. Further for example, step 595 may comprise returning execution flow of the exemplary method 500 back up to step 510 to place the first receiver back in a sleep mode. The scope of various aspects of the present invention should not be limited by characteristics of any particular type of continued processing.

The exemplary method 500 was presented to provide specific illustrations of various generally broader aspects of the present invention. Accordingly, the scope of various aspects of the present invention should not be limited by particular characteristics of the exemplary method 500.

The previous discussion of FIGS. 1-5 generally concerned exemplary scenarios with dual radios or radio modules and a single type of communication signal. Such exemplary scenarios were presented for illustrative clarity and should not limit the scope of various aspects of the present invention to single-mode mobile communication devices. For example, various aspects of the present invention are readily extensible to multi-mode radio systems (e.g., radios receiving communication signals communicated in accordance with more than one communication protocol). For example and without limitation, a first receiver or receiver module may receive a communication signal, analyze the communication signal to determine whether to wake a second receiver associated with a first communication protocol or a third receiver associated with a second communication protocol. Also for example, a first receiver or receiver module and a second receiver or receiver module may both receive a communication signal and may each determine whether to wake respective associated sleeping receivers.

In summary, various aspects of the present invention provide a mobile communication device with a low power receiver for signal detection and a method for utilizing a low power receiver for signal detection in a mobile communication device. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A mobile communication device, comprising:
   a first receiver module operable to process, at a first level of processing quality, a communication signal corresponding to a first communication protocol while consuming a first amount of power; and
   a second receiver module operable to process, at a second level of processing quality less than the first level of processing quality, a communication signal corresponding to the first communication protocol while consuming a second amount of power, the second amount of power being less than the first amount of power.

2. The mobile communication device of claim 1, comprising one or more modules operable to analyze information, said information communicated by the communication signal and obtained by the second receiver module processing the communication signal, to determine whether to utilize the first receiver module.

3. The mobile communication device of claim 2, wherein the information comprises information identifying a source of the communication signal.

4. The mobile communication device of claim 2, wherein the information comprises information identifying a destination of the communication signal.

5. The mobile communication device of claim 2, wherein the information comprises information indicating that a message is awaiting delivery to the mobile communication device.

6. The mobile communication device of claim 2, wherein the information comprises information indicating initiation of a peer-to-peer communication with the mobile communication device.

7. The mobile communication device of claim 1, wherein:
the first receiver module operates to process a communication signal utilizing a first component constructed using a first semiconductor technology; and
the second receiver module operates to process a communication signal utilizing a second component, generally analogous to the first component, the second component constructed using a second semiconductor technology different from the first semiconductor technology.

8. The mobile communication device of claim 1, wherein:
the first receiver module operates to utilize a frequency synthesizer that generates a signal characterized by a first quality level; and
the second receiver module operates to utilize a frequency synthesizer that generates a signal characterized by a second quality level that is less than the first quality level.

9. The mobile communication device of claim 1, wherein:
the first receiver module operates to utilize an analog-to-digital converter characterized by a first quality level; and
the second receiver module operates to utilize an analog-to-digital converter characterized by a second quality level that is less than the first quality level.

10. The mobile communication device of claim 1, wherein:
the first receiver module operates to utilize a filter characterized by a first quality level; and
the second receiver module operates to utilize a filter characterized by a second quality level that is less than the first quality level.

11. The mobile communication device of claim 1, wherein:
the first receiver module operates to utilize a decoder characterized by a first quality level; and
the second receiver module operates to utilize a decoder characterized by a second quality level that is less than the first quality level.

12. The mobile communication device of claim 1, wherein the second receiver module is operable in a plurality of modes comprising:
a first mode characterized by sleep mode characteristics; and
a second mode, in which the second receiver module processes a communication signal.

13. The mobile communication device of claim 1, wherein the first receiver module and the second receiver module share at least a portion of their respective components.

14. In a mobile communication device, a method for operating the mobile communication device in an energy-efficient manner, the method comprising:
operating a first receiver module to process, at a first level of processing quality, a communication signal corresponding to a first communication protocol while consuming a first amount of power; and
operating a second receiver module to process, at a second level of processing quality less than the first level of processing quality, a communication signal corresponding to the first communication protocol while consuming a second amount of power, the second amount of power being less than the first amount of power.

15. The method of claim 14, comprising analyzing information, said information communicated by the communication signal and obtained by the second receiver module processing the communication signal, to determine whether to utilize the first receiver module.

16. The method of claim 15, wherein the information comprises information identifying a source of the communication signal.

17. The method of claim 15, wherein the information comprises information identifying a destination of the communication signal.

18. The method of claim 15, wherein the information comprises information indicating that a message is awaiting delivery to the mobile communication device.

19. The method of claim 15, wherein the information comprises information indicating initiation of a peer-to-peer communication with the mobile communication device.

20. The method of claim 14, wherein:
operating the first receiver module to process a communication signal comprises utilizing a first component constructed using a first semiconductor technology; and
operating the second receiver module to process a communication signal comprises utilizing a second component, generally analogous to the first component, the second component constructed using a second semiconductor technology different from the first semiconductor technology.

21. The method of claim 14, wherein:
operating the first receiver module to process a communication signal comprises utilizing a frequency synthesizer that generates a signal characterized by a first quality level; and
operating the second receiver module to process a communication signal comprises utilizing a frequency synthesizer that generates a signal characterized by a second quality level that is less than the first quality level.

22. The method of claim 14, wherein:
operating the first receiver module to process a communication signal comprises utilizing an analog-to-digital converter characterized by a first quality level; and
operating the second receiver module to process a communication signal comprises utilizing an analog-to-digital converter characterized by a second quality level that is less than the first quality level.

23. The method of claim 14, wherein:
operating the first receiver module to process a communication signal comprises utilizing a filter characterized by a first quality level; and operating the second receiver module to process a communication signal comprises utilizing a filter characterized by a second quality level that is less than the first quality level.

24. The method of claim 14, wherein:

operating the first receiver module to process a communication signal comprises utilizing a decoder characterized by a first quality level; and operating the second receiver module to process a communication signal comprises utilizing a decoder characterized by a second quality level that is less than the first quality level.

25. The method of claim 14, comprising operating the second receiver module in a plurality of modes comprising:

a first mode characterized by sleep mode characteristics; and a second mode, in which the second module processes a communication signal.

26. The method of claim 14, wherein:

operating the first receiver module to process a communication signal comprises utilizing a first set of components; and operating the second receiver module to process a communication signal comprises utilizing a second set of components, at least a portion of which overlaps with the first set of components.

* * * * *

UNITED STATES PATENT AND TRADEMARK OFFICE
CERTIFICATE OF CORRECTION

PATENT NO. : 8,055,313 B2
APPLICATION NO. : 12/559617
DATED : November 8, 2011
INVENTOR(S) : Behzad et al.

Page 1 of 1

It is certified that error appears in the above-identified patent and that said Letters Patent is hereby corrected as shown below:

On the cover sheet, item 73, assignee name, please replace "Broadcom Corporaation" with "Broadcom Corporation"

Signed and Sealed this
Tenth Day of April, 2012

David J. Kappos
*Director of the United States Patent and Trademark Office*